United States Patent [19]
Jung

[11] Patent Number: 5,516,568
[45] Date of Patent: May 14, 1996

[54] OPTICAL RECORDING MEDIUM

[75] Inventor: Hee-Tae Jung, Kyungki-do, Rep. of Korea

[73] Assignee: Cheil Synthetics, Inc., Kyungsangbuk-do, Rep. of Korea

[21] Appl. No.: 487,350

[22] Filed: Jun. 7, 1995

Related U.S. Application Data

[62] Division of Ser. No. 175,839, Dec. 30, 1993.

[51] Int. Cl.⁶ ........................................ B32B 3/00
[52] U.S. Cl. .................. 428/64.1; 428/64.2; 428/64.4; 428/64.8; 428/913; 430/270.1; 430/495.1; 430/945; 369/272; 369/275.1; 369/275.2; 369/283; 369/288
[58] Field of Search ......................... 428/64.1, 64.1, 428/64.4, 64.8, 913; 430/270, 495, 945; 369/272, 275.1, 275.2, 283, 288

[56] References Cited

U.S. PATENT DOCUMENTS

| | | | |
|---|---|---|---|
| 4,293,435 | 10/1981 | Portugall et al. | 252/299.01 |
| 4,334,000 | 6/1982 | Chang et al. | 430/58 |
| 4,353,971 | 10/1982 | Chang et al. | 430/58 |
| 4,722,595 | 2/1988 | Siol | 350/353 |
| 4,855,976 | 8/1989 | Yamazaki | 369/13 |
| 4,904,066 | 2/1990 | Gray et al. | 350/350 S |
| 5,284,691 | 2/1994 | Taniguchi et al. | 428/64 |

FOREIGN PATENT DOCUMENTS

| | | |
|---|---|---|
| 3500838 | 7/1986 | Germany. |
| 57046362 | 9/1980 | Japan. |
| 58048245 | 9/1981 | Japan. |
| 58197088 | 5/1982 | Japan. |
| 59010930 | 7/1982 | Japan. |
| 59005096 | 7/1982 | Japan. |
| 60208390 | 3/1984 | Japan. |
| 60114823 | 9/1984 | Japan. |
| 60166481 | 8/1985 | Japan. |
| 62109245 | 11/1985 | Japan. |
| 61017037 | 1/1986 | Japan. |
| 61028004 | 2/1986 | Japan. |
| 61128244 | 6/1986 | Japan. |
| 63074135 | 9/1986 | Japan. |
| 63163341 | 12/1986 | Japan. |
| 63179792 | 1/1987 | Japan. |
| 63273688 | 5/1987 | Japan. |
| 62175939 | 8/1987 | Japan. |
| 63098852 | 4/1988 | Japan. |

Primary Examiner—Patrick J. Ryan
Assistant Examiner—Elizabeth Evans
Attorney, Agent, or Firm—Saliwanchik & Saliwanchik

[57] ABSTRACT

There is disclosed an organic optical recording medium with high data storage density, high data rates and long data archival capabilities, useful as a medium for recording a variety of information or pictures.

In a preferred embodiment, the optical recording medium according to the present invention comprises a substrate, a reflective layer, a charge-generating layer containing at least one charge-generating material, a charge-transferring layer containing at least one charge-transferring material, a recording layer containing at least one electric field-discoloring element, a plurality of spacers, an air layer and a protective layer.

A laser beam is absorbed to the charge-generating material contained in the charge-generating layer, to generate charges, which are subsequently transferred to the surface of the recording layer by the charge-transferring layer.

With the influence of the charge generated, the illuminated area having the charges puts on a color different from that in the other areas. In readout of the recorded information, a laser beam of lesser intensity is scanned across the recorded medium. The erasure of the recorded data is carried out by discharging the charges generated on the surface of the recording layer. As a result, the erasure in the optical recording medium is performed much simpler.

4 Claims, 1 Drawing Sheet

OPTICAL RECORDING MEDIUM

This is a division of application Ser. No. 08/175,839, filed Dec. 30, 1993, pending.

BACKGROUND OF THE INVENTION

1. Field of the Invention

The present invention relates, in general, to an organic, optical data storage medium which is recordable, readable and erasable by using laser beam and, more particularly, to an organic, optical recording medium with high data storage density, high data rates and long data archival capabilities, useful as a medium for recording a variety of information or pictures.

2. Description of the Prior Art

The variety and amount of information has increased at an explosive rate in today's information-intensive society. Such an information increase requires recording media to be higher in data storage capacity or density, data rate, and to be faster in operation.

Currently, the practical or commercial techniques for recording data are based substantially on magnetic storage technology. In general, the data are stored on magnetic media, such as video tapes, audio tapes, floppy discs and the like, on which information is recorded depending on the direction of magnetization of magnetic substances in the magnetic medium.

While the magnetic storage technology is commercially successful and advantageous, a recording technique known generically as optical recordings has been and continues to be considered a very promising alternative for storage data, as a recording media with higher capacity is demanded according to the enormous amount of information resulting from the society development.

A magneto-optic recording medium comprises a recording film magnetizable in the direction perpendicular to the plane of the film itself, in contrast to the conventional magnetic medium. In addition, the coercive force of a magneto-optical medium, which is a measurement of strength maintaining the previous direction of magnetization, is about 5 to 10 times as high as that of a magnetic medium. Accordingly, using a magneto-optic recording medium, it is very difficult to change the previous direction of magnetization with an external magnetic field.

The recording of information on a magneto-optic recording film is effected by first focusing a modulated laser beam at a point approximately 1 µm in diameter on the surface of the film. The laser beam power should be sufficient to heat the film locally, for example, to the Curie point temperature of the film. In this state, the direction of magnetization can be changed with an external magnetic field, so as to record information on the film according to the direction.

When the information is recorded by this method, the storage unit of information comes to be reduced to approximately 1 µm or less in size. Accordingly, the recording density of magneto-optical medium is 10 to 1,000 times greater than that of conventional magnetic recording medium. In addition, the magneto-optical medium employs a non-contact reproducing method, so that magneto-optical recording potentially has significant advantages over magnetic recording, including easier data preservation and longer data archival capability.

However, there have historically been many disadvantages in producing the magneto-optic recording media used in such method. For example, heavy metals are commonly used as magnetic substances and a vacuum deposition or sputtering apparatus is required.

Many attempts have been made to solve such disadvantages. One of the attempts is to develop an organic optical recording material. The organic optical recording material may be grouped into (1) a write-once/read-many (hereinafter, referred as "WORM") type, and (2) a rewritable (hereinafter, "RW") type on the basis of the erasability of the material.

On the WORM type material, only readout of information is possible after recording data once, whereas, on the RW type material, erasure of the data is also possible after recording.

WORM type medium is manufactured, as disclosed in Japanese Patent Laid-Open Publication Nos. Sho. 57-46362, 58-197088, 59-5096 and 63-179792, by coating laser-absorbent dye admixtured with polymer on a reflective layer to form a recording layer and overcoating a protective layer on the recording layer. In this optical recording system, to write a data bit, a laser beam is focused on a very small spot of the recording layer, for example, approximately 1 µm or less in diameter, to generate sufficient heat in the laser-absorbent dye, which heat decomposes the polymer to form a pit. The reproduction of the recorded information is effected by using the difference of the reflectivity according to the presence of the pit. Since, in WORM type material, the recorded portion is in a polymer-decomposed state, it is impossible to rerecord data on the polymer-decomposed portion after erasing the information.

A RW type material has been vigorously researched and the direction of the research proceeds to a heat mode using a light as heat or to a photon mode using a photon of light.

In the heat mode, the recording or reproducing of information is effected by optical change generated when a recording laser beam is irradiated to a localized area of the recording layer to bring out melting, vaporization, thermal deformation, thermal transfer and the like.

As an optical recording medium employed in such heat mode, there have been energetically studied two optical mediums, wherein one medium employs TbFe, CdFe, TbFeCo and the like, taking advantage of the Paraday effect and the Kerr effect. The other heat mode optical recording medium employs inorganic metals represented as Te, such as TeOX, Te—Ge, Te—Ge—Sb, and Te—Ge—Sb—Ti. However, since this heat mode optical medium employs a material harmful to human body and it is produced, employing a sputtering method, the stability of the medium is low and it is difficult to carry out the production process. What is worse, the heat mode optical medium shows low recording sensibility and is problematic in the stability of recorded state and the write-over capability on high speed erasure.

Therefore, there is demanded a nontoxic, low-priced medium capable of erasing data in a high speed and of showing high recording sensibility and stability.

To develop a material for satisfying these properties, a variety of methods employing a nontoxic, low-cost, organic polymeric material have been suggested.

For example, a method utilizing a thermoplastic resin and a far infrared ray-absorbent dye has been disclosed in Japanese Patent No. 5848245 and a method using a polymer blend has been proposed in U.S. Pat. No. 4,722,595. However, these methods are problematic in recording sensitivity and recording/erasure repetition.

A variety of methods utilizing the phase transfer of liquid crystal have been proposed in Japanese Patent Laid-Open Publication Nos. Sho. 59-10930, 60-114823 and 60-166481, and U.S. Pat. No. 4,904,066. However, since an electrode is employed in these patents, the structure of the medium is complicated and there are disadvantages in recording sensitivity, responsibility and reliability.

As polymeric liquid crystal materials used in optical recording, main chain type liquid crystal polymers have been reported in Japanese Patent Nos. 6128004 and 62175939 and side chain type liquid crystal polymers have been described in German Patent No. 3500838. However, they can not be put into practical use since their recording sensitivity, contrast and repetitive erasability are unsatisfactory and the speed of response is slow.

To improve the responsibility of liquid crystal, a photoisomeric method has been advanced in Japanese Patent No. 6398852, by which a photochromic molecule, such as azobenzene, is bonded to a side chain of a polypeptide having a photochromic liquid crystal layer, using the relation between photoreaction and liquid crystal. However, this method also shows some problems in contrast, repetitive erasability and data archival capability and thus, is not industrially available.

In the meantime, the optical recording method according to the photon mode has attracted attention by virtue of its high sensibility and high speed erasure. As an optical recording material, there have been photochromic materials using spiropyran compounds in Japanese Patent Publication No. Sho. 61-17037, fulgid or indigo in Japanese Patent Publication No. Sho. 61-128244.

However, while these materials have superior such properties as high sensitivity and high speed erasure, they are inferior in stability and repetitive erasability in a color developing state due to their poor light resistance. In addition, since an ultra violet ray and a visible ray are, in general, used as a recording light and an erasing light, respectively, in photochromic compounds, it is difficult to stably store data and a reverse reaction is apt to occur during a photochromic reaction.

Owing to the aforementioned problems, the optical recording medium has not been rapidly developed in spite of its superior properties, such as high data storage density and high speed.

BRIEF SUMMARY OF THE INVENTION

For solving the problems encountered in the prior art, the present inventors have recognized that there exist needs for the improvement in the aspects of stability, sensitivity and complexity of erasing system and for a novel, organic optical recording medium having these advantages, in order to provide a new method of optical recording.

Accordingly, it is an object of the present invention to provide an optical medium, superior in recording sensitivity.

It is another object of the present invention to provide an optical medium, improved in long archival capability.

It is further an object of the present invention to provide an optical medium, capable of erasing data in a high speed.

It is still another object of the present invention to provide an optical medium with higher data storage density.

In accordance with the present invention, the above object can be accomplished by providing an optical recording medium, comprising: a reflective layer formed over a substrate layer, reflecting an incident laser beam with a predetermined wavelength; a charge-generating layer coated on the upper surface of the reflective layer, containing at least one charge-generating material, the incident laser beam generating charges on the charge-generating layer; a charge-transferring layer coated on the upper surface of the charge-generating layer, containing at least one charge-transferring material transferring the charges from the charge-generating layer into an upper layer thereof; a recording layer coated over the charge-transferring layer, containing at least one electric field discoloring element, the transferred charges discoloring the electric field discoloring element in the area illuminated by the laser beam, so as to record information; a protective layer formed over the recording layer; and in case of need a plurality of spacers formed on the both upper sides of the recording layer, forming an air layer therebetween.

BRIEF DESCRIPTION OF THE DRAWINGS

Other objects and aspects of the invention will become apparent from the following description of embodiments with reference to the accompanying drawings in which.

DETAILED DISCLOSURE OF THE INVENTION

Figure 1:
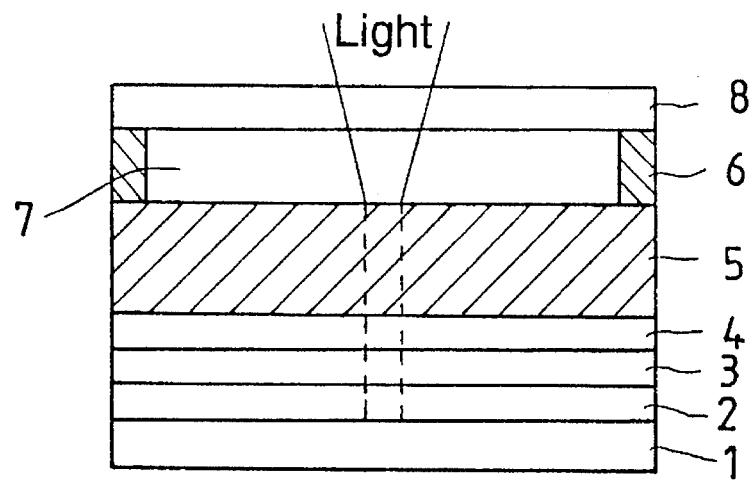
FIG. 1 is a schematic, cross-sectional view showing the structure of an optical recording medium according to an embodiment of the present invention.

Hereinafter, the preferred embodiment of the present invention will be, in detail, described with reference to the accompanying drawings, wherein like reference numerals designate like parts, respectively.

FIG. 1 illustrates in simplified form the essential features of an embodiment of the present invention employing longitudinal optical recording. As shown in this drawing, the optical recording medium according to the present invention comprises a substrate 1, a reflective layer 2, a charge-generating layer 3 containing at least one charge-generating material, a charge-transferring layer 4 containing at least one charge-transferring material, a recording layer 5 containing at least one electric field-discoloring element, a plurality of spacers 6, an air layer 7 and a protective layer 8, in some cases spacers 6 and air layer 7 can be omitted. In this drawing, there is shown a laser beam which is focused on an area to be recorded.

Figure 2:
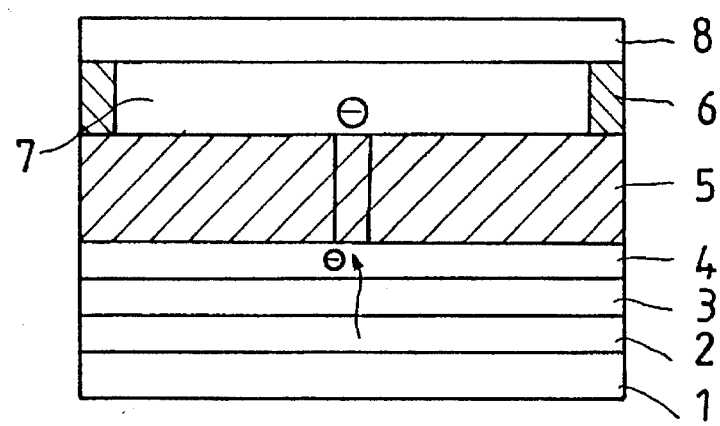
FIG. 2 is a schematic, cross-sectional view illustrating the recording procedure of an optical recording medium, according to an embodiment of the present invention.

Referring now to FIG. 2, there is illustrated a recording procedure in the optical recording medium of FIG. 1, according to the present invention.

As illustrated in this drawings, the irradiated laser beam having a wavelength range necessary to record data is absorbed to the charge-generating material in the charge-generating layer, to generate, on the surface of the charge-generating layer, a charge, which is subsequently transferred to the surface of the recording layer by the charge-transferring layer. Therefore, an electric field effect is generated on the area illuminated with the laser beam.

With the influence of the charge generated, the illuminated area having the charge puts on a color different from that in the other, non-illuminated areas. The recording of information on such a medium is effected through the above procedure.

In readout of the recorded information, a laser beam of intensity lesser than that of the laser beam intensity used in recording, that is, a laser beam having an energy incapable of generating the charge is scanned across the recorded medium, a technique being employed to reproduce information relaying upon the difference of the light transmitted through or reflected from the optical recording medium.

Figure 3:
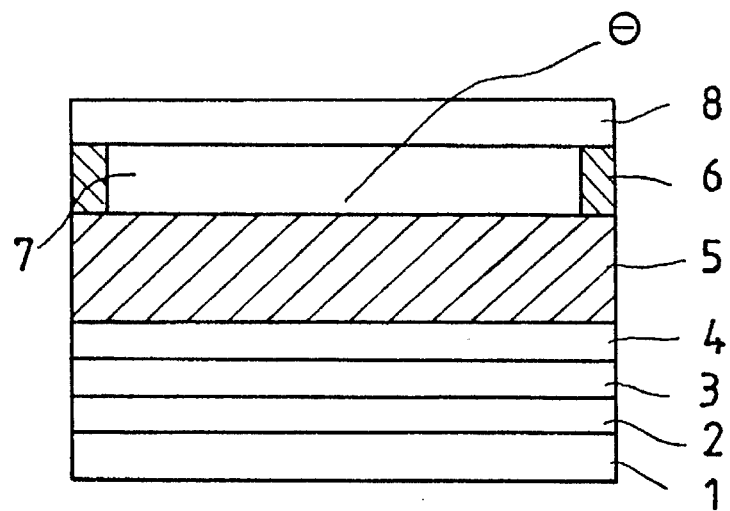
FIG. 3 is a schematic, cross-sectional view illustrating the erasing procedure of an optical recording medium, according to an embodiment of the present invention.

Turning now to FIG. 3, there is illustrated an erasure procedure in the optical recording medium of FIG. 1, according to the present invention.

As illustrated in this drawing, the erasure of the recorded data is carried out by discharging the charge generated on the surface of the recording layer 5. As a result, the erasure in the inventive optical recording medium is performed much simpler than in the conventional organic optical erasing system.

The reflective layer 2 is deposited with a metallic ingredient in a thickness ranging from approximately 50 to approximately 1,000 Å and preferably selected from the group consisting of gold and aluminum.

As materials for the charge-generating layer 3 and the charge-transferring layer 4, either inorganic materials or organic materials can be utilized.

The inorganic materials utilized for the charge-generating layer 3 and the charge-transferring layer can include seleniums, cadmium sulfides, zinc oxides and amorphous silicons. The use of inorganic material allows the charge-generating layer and the charge-transferring layer to be one layer, since an inorganic material generally has the properties of charge generation and charge transfer, at the same time.

On the other hand, when the charge-generating layer 3 employs an organic material as a charge-generating material, it is formed by dispersing at least one charge-generating material in a resin and coating the resulting solution on the reflective layer 2.

The resin used for the charge-generating layer 3 must be capable of transmitting at least 80% of the incident laser beam with a recordable wavelength band, and can include polycarbonate, poly(methyl methacrylate), polystyrene and amorphous polyolefin. Polycarbonate resin is generally used for the charge-generating layer 3.

The charge-generating materials are used, as being dispersed in the resin. Preferred charge-generating material includes at least one compound selected from the group consisting of polyazos, phenylene tetracarboxy diimides, polycyclic quinones, phthalocyanines, squaryliums and phiapyryliums.

The charge-transferring layer 4 coated on the charge-generating layer 3 comprises a resin used in the charge-generating layer 3 and at least one charge-transferring material. The charge-transferring materials are used, as being dispersed in the resin. Preferred charge-transferring material includes at least one selected from the group consisting of pyrazolines, stilbenes, hydrazones, triphenyl methanes, heterocyclics and conjugated arylamides.

The charge-generating layer 3 is preferably formed in a thickness ranging from approximately 0.1 μm to approximately 0.3 μm, whereas the charge-transferring layer 4 is preferably formed in a thickness ranging from approximately 3 to approximately 30 μm.

The materials for the charge-generating layer 3 and the charge-transferring layer 4 would be readily apparent to a person of ordinary skill in the art having the benefit of this disclosure and are to be suitably selected, according to the recordable wavelength band of laser.

The electric field discoloring element used in the present invention is to effect high reflectivity in the recording layer 5 and is a material capable of transmitting at least 70% of the incident laser beam with a recordable wavelength band. As an electric field discoloring element, there may be employed all conductive polymers which can be discolored by an electric field, preferably compounds represented as the following formulas I through VII and most preferably polypyrrole, represented as the following formula III.

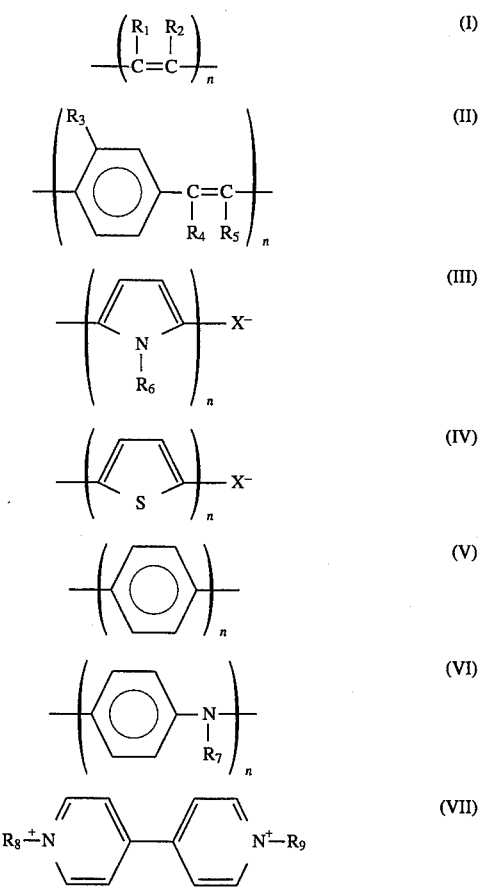

wherein n is an integer not less than 4; $R_1$ to $R_9$ is hydrogen, an alkyl group, an alkoxy group or a phenyl group; and $X^-$ is $ClO_4^-$, $BF_4^-$ or $AsF_5^-$.

In case of using the compounds represented as the above formulas, the compounds are electro-polymerized and coated on the charge-transferring layer 4 in a thickness not more than approximately 20 μm. The amount of the compound is preferably on the order of approximately 0.2% to approximately 20% by weight, based on the weight of the solvent used. For example, if too little of the compound is used, the discoloring degree caused by an electric field is so low that there may be generated a problem in its recording property. On the other hand, if too much of the compound is used, a light absorption rate becomes too large to obtain a reflectivity value necessary for to the recording of information.

The discoloring of the recording layer 5 is easily recognized, since the recording layer 5 employing the above electric field discoloring element, for example, polypyrrole, puts on a blue color in an oxidized state, whereas the polypyrrole discoloring element in the recording layer is a yellowish green color in a reduced state.

A pair of spacers 6 can be formed on both upper side regions of the recording layer 5 comprising the electric field discoloring element, maintaining an air layer 7 therebetween, in accordance with the present invention. Preferred materials for the spacers 6 include glass bead.

A protective layer 8 can be formed over the recording layer 5. If present, the air layer 7 is formed between the recording layer 5 and the protective layer 8, according to the present invention. The protective layer 8 can be made of the same material as the substrate 1 and preferably of polycarbonate.

The present invention can further employ a photo mask over the recording layer 5 comprising the electric field discoloring element, effecting a more stable recording state. When used, the photo mask has to be divided into a size as large as the focus of the incident laser beam and preferably not more than 3 μm.

The recording and erasing procedure of the inventive optical recording medium is as described above and of which a brief summary is given in FIGS. 2 and 3.

The organic, optical recording medium provided in accordance with the present invention is superior in recording sensitivity and data stability.

Now, the preferred embodiment of the present invention will be further described with reference to the following specific examples.

EXAMPLE 1

Gold (Au) was deposited on a polycarbonate substrate in a thickness of 800 Å. Polycarbonate resin and PROGEN, a phthalocyanine compound used as a charge-generating material and commercially available from ICI company, were dissolved in a solvent to give a solution wherein the weight ratio of polycarbonate to the charge-generating material was 50:50. Then, the solution was spin-coated on the deposited substrate in a thickness of 0.2 μm and stored at 80° C. for 10 hours to remove the solvent from the substrate.

On this charge-generating layer, there was coated a solution wherein polycarbonate and a charge-transferring material were dissolved in a solvent in weight ratio 50:50 of polycarbonate to the charge-transferring material. The solvent was dried out under the same conditions as the above. As the charge-transferring material, PROPRANT, a hydrazone compound commercially available from ICI company, was used.

On the charge-transferring layer formed, a solution of electropolymerized polypyrrole, an electric field discoloring material, and a solvent wherein polypyrrole amounted to 5% by weight of the solvent, were spin-coated in a thickness of 5 μm. The resulting structure was heated to 80° C. in an oven for 5 hours, to remove the solvent sufficiently. The molecular structure of polypyrrole used as a material for a recording layer was given as designated formula III-1 in the following Table 1.

On both upper side regions of the recording layer, there were formed spacers of glass bead, followed by the formation of polycarbonate plate thereon, so as to prepare an optical recording medium.

Reflectivity of the prepared medium was measured with respect to a light source with a wavelength of 780 nm, to obtain a reflectivity value of 45%. As apparent from this value, it has high reflectivity as a recording medium.

Measurement was carried out with a modulated laser beam ($\lambda$=780 nm) with 10 mW, under the conditions of 0.1 μm sec., 600 rpm and 300 KHz, recording a result. It was ascertained that the recording area appeared yellowish green under an electrostatic state. Thereafter, a laser beam ($\lambda$=780 nm) with 1.0 mW was irradiated in the same condition as the above, recording a result. From the results, C/N ratio (hereinafter, referred as "CNR") was measured to obtain a CNR value of 57 dB. This CNR value is to confirm that the organic optical recording material is superior in recording property to other erasable, organic optical recording materials.

The organic optical recording medium was left at a temperature of 40° C. and a relative humidity of 80% for 10 days and was then subjected to the measurement, to obtain a CNR value of 56 dB. The organic optical recording medium also was left at temperature of −10° C. for 10 days, obtaining the same CNR value, 56 dB. These results also verify that the medium according to the present invention is a stable, organic optical recording material in any condition.

After the recording and reproducing was iteratively performed 300 times, the property of the recording and erasure were measured, to obtain a superior result of a CNR value of 56 dB.

The results are, in detail, given as shown in the following Table 1.

EXAMPLE 2

An optical recording medium was prepared in a manner similar to that in Example 1, except that, as an electric field discoloring element, a compound of general formula VI (detailed molecular formula VI-1 given in Table 1) was used.

Testing for the recording, erasure and reliability was iteratively performed and the properties were measured, under the same conditions as Example 1.

As a result, the reflectivity was similar to that in Example 1 and CNR from the test of recording/erasure/reliability was a bit less than in Example 1 but superior to other conventional recording materials. The results of the testing are, in detail, given as shown in the following Table 1.

EXAMPLE 3

An optical recording medium was prepared in a manner similar to that in Example 1, except that, as an electric field discoloring element, a compound of general formula IV (detailed molecular formula IV-1 given in Table 1) was used.

Testing for the recording, erasure and reliability was iteratively performed and the properties were measured, under the same conditions as Example 1.

As a result, the properties were as superior as those in Example 2. The results are, in detail, given as shown in the following Table 1.

EXAMPLE 4

An optical recording medium was prepared in a manner similar to that in Example 1, except that, as an electric field discoloring element, a compound of general formula II (detailed molecular formula II-1 given in Table 1) was used.

Testing for the recording, erasure and reliability was iteratively performed and the properties were measured, under the same conditions as Example 1.

As a result, the properties were as superior as those in Example 2. The results are, in detail, given as shown in the following Table 1.

EXAMPLE 5

An optical recording medium was prepared in a manner similar to that in Example 1, except that, as an electric field discoloring element, a compound of general formula VII (detailed molecular formula VII-1 given in Table 1) was used.

Testing for the recording, erasure and reliability was iteratively performed and the properties were measured, under the same conditions as Example 1.

The results are, in detail, given as shown in the following Table 1.

EXAMPLE 6

An optical recording medium was prepared in a manner similar to that in Example 1, except that, as an electric field discoloring element, a compound of general formula V (detailed molecular formula V-1 given in Table 1) was used.

Testing for the recording, erasure and reliability was iteratively performed and the properties were measured, under the same conditions as Example 1.

The results are, in detail, given as shown in the following Table 1.

EXAMPLE 7

An optical recording medium was prepared in a manner similar to that in Example 1, except that, as an electric field discoloring element, a compound of general formula I (detailed molecular formula I-1 given in Table 1) was used.

Testing for the recording, erasure and reliability was iteratively performed and the properties were measured, under the same conditions as Example 1.

The results are, in detail, given as shown in the following Table 1.

EXAMPLE 8

An optical recording medium was prepared in a manner similar to that in Example 1, except that a selenium layer is formed in a thickness of 0.5 μm as a charge-generating and charge-transferring section in lieu of separate charge-generating and charge-transferring layers.

Testing for the recording, erasure and reliability was iteratively performed and the properties were measured, under the same conditions as Example 1.

The results are, in detail, given as shown in the following Table 1.

EXAMPLE 9

An optical recording medium was prepared in a manner similar to that in Example 1, except that a photo mask was placed on the recording layer comprising an electric field discoloring element.

Testing for the recording, erasure, and reliability was iteratively performed and the properties were measured, under the same conditions as Example 1. As a result, there was obtained a recording resolution of about 1.2 μm, which was superior to the approximately 2 μm recording resolution value from the other Examples 1 through 8. The other properties were similar to those in the other Examples, as given in Table 1.

Consequently, the use of photo mask allows the optical recording medium to be improved.

COMPARATIVE EXAMPLE 1

An optical recording medium was prepared in a manner similar to that in Example 1, except that an electric field discoloring element amounted to 25% by weight of the solvent.

Testing for the recording, erasure and reliability was iteratively performed and the properties were measured under the same conditions as Example 1.

From the result of the test, it was found that since the transmission of the light was reduced at the high concentration of the electric field discoloring element, which resulted, in turn, in lowering the reflectivity, this medium was inferior in its general properties as a recording material as compared to the recording material of the other Examples. Accordingly, this optical recording medium was proved to be problematic, as a recording material.

The results are, in detail, given as shown in the following Table 1.

COMPARATIVE EXAMPLE 2

An optical recording medium was prepared in a manner similar to that in Example 1, except that, as a resin, polypropylene was used in lieu of polycarbonate.

Testing for the recording, erasure and reliability was iteratively performed and the properties were measured, under the same conditions as Example 1. However, the reflectivity was very low, so that the recording and erasure was difficult.

TABLE 1

| Exm. No. | Reflectivity (unrecorded area) | E.F.E.* (record layer) | Conc. of Rec. layer (wt %) | Initial Record | CNR (dB) After 300 times | Hot test[#] | Cold test[##] |
|---|---|---|---|---|---|---|---|
| 1 | 45% | III-1 | 5 | 57 | 56 | 56 | 56 |
| 2 | 42% | VI-1 | 5 | 51 | 49 | 48 | 49 |
| 3 | 42% | IV-1 | 5 | 50 | 49 | 48 | 48 |
| 4 | 43% | II-1 | 5 | 51 | 50 | 46 | 47 |
| 5 | 46% | VII-1 | 5 | 58 | 56 | 56 | 56 |
| 6 | 45% | V-1 | 5 | 51 | 50 | 47 | 47 |
| 7 | 45% | I-1 | 5 | 51 | 50 | 47 | 47 |
| 8 | 44% | III-1 | 5 | 50 | 48 | 49 | 49 |
| 9 | 42% | III-1 | 5 | 50 | 48 | 49 | 49 |
| C-1 | 20% | III-1 | 25 | 20 | 10 | 9 | 8 |
| C-2 | 11% | III-1 | 5 | — | — | — | — |

Detailed molecular formulas:

TABLE 1-continued

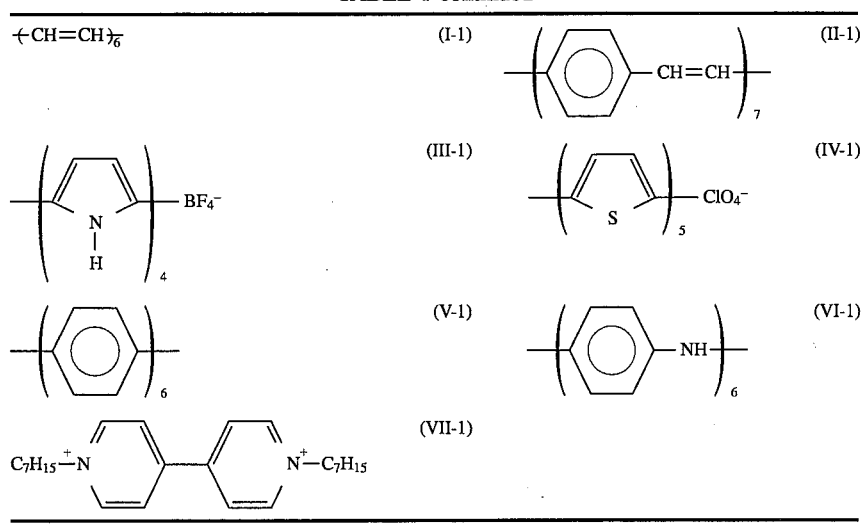

: test for sample left at 40° C., 80% RH for 10 days
: test for sample left at −10° C. for 10 days
*: electric field discoloring element As apparent from the Examples and Comparative Examples, the optical recording medium according to the present invention, has superior properties, e.g., high data storage density, high data rates and long data archival capability.

Although the preferred embodiments of the invention have been disclosed for illustrative purpose, those skilled in the art will appreciate that various modifications and additions are possible, without departing from the scope and spirit of the invention as disclosed in the accompanying claims.

I claim:

1. A method for recording, reading and erasing information on an optical recording medium having a substrata layer, a reflective layer, a charge-generating and transferring section comprised of charge-generating material and charge-transferring material, respectively, and a recording layer, said method comprising the steps of:

recording the information by illuminating the charge-generating material with a laser beam having a wavelength and intensity capable of generating a charge, and transferring the charge to the recording layer having a discoloring element whereby said discoloring elements puts on a color in a charged state different than in an uncharged state;

reading the recorded information by illuminating with a laser beam on the recording medium, wherein, said laser beam for reading said recorded information has a lesser intensity than the laser beam used to record the information; and erasing the recorded information by discharging the charge generated and transferring to the recording layer.

2. A method for recording information on the optical recording medium of claim 1, wherein said method comprises illuminating the charge-generating material with a laser beam having a wavelength and intensity capable of generating a charge, wherein said charge is transferred to the recording layer having a discoloring element whereby said discoloring element puts on a color in a charged state different than in an uncharged state.

3. A method for reading information recorded on the optical recording medium of claim 1 wherein said reading method comprises illuminating with a laser beam said optical recording medium having recorded information, wherein said laser beam for reading said recorded information has a lesser intensity than the laser beam used to record the information.

4. A method for erasing recorded information from the optical recording medium of claim 1 wherein said method comprises discharging the charge generated and transferred to the recording layer.

* * * * *